Nov. 13, 1945.  R. A. PETERSON  2,388,703
GEOLOGICAL PROSPECTING SYSTEM
Filed Sept. 20, 1941  5 Sheets-Sheet 1

INVENTOR.
RAYMOND A. PETERSON.
BY
ATTORNEYS.

INVENTOR,
RAYMOND A. PETERSON.
BY
ATTORNEYS.

Nov. 13, 1945.   R. A. PETERSON   2,388,703
GEOLOGICAL PROSPECTING SYSTEM
Filed Sept. 20, 1941   5 Sheets-Sheet 4

INVENTOR,
RAYMOND A. PETERSON.
BY
ATTORNEYS.

Nov. 13, 1945.　　　R. A. PETERSON　　　2,388,703
GEOLOGICAL PROSPECTING SYSTEM
Filed Sept. 20, 1941　　　5 Sheets-Sheet 5

INVENTOR,
RAYMOND A. PETERSON.
BY
ATTORNEYS.

Patented Nov. 13, 1945

2,388,703

UNITED STATES PATENT OFFICE 2,388,703

GEOLOGICAL PROSPECTING SYSTEM

Raymond A. Peterson, Pasadena, Calif., assignor to United Geophysical Company, Inc., a corporation of California Application September 20, 1941, Serial No. 411,700

9 Claims. (Cl. 181—0.5)

My invention is concerned with geological prospecting and particularly with the application of the method of seismic prospecting to the location and delineation of valuable ore bodies. This invention aims to provide an improved method of studying seismic wave travel in the earth and of mapping ore bodies. By means of my method, I am able to outline accurately portions of a region under investigation which contains ore bodies, and simultaneously determine those portions of the regions under investigation which do not contain ore bodies.

The principal method of locating ore bodies in the past has involved the extension of mine workings and the drilling of bore holes into the earth in order to extract cores from any ore body intercepted by the hole, or to locate stringers which might then be traced to their origin. Some geophysical methods of locating ore bodies have been developed. One such method involving the use of seismic waves was described by Reginald A. Fessenden, in Patent No. 1,240,328. In his method the times required for waves to travel from a generating point to or through an ore body, and from thence to a reception point were measured, and were used to determine loci upon which the ore body was located. According to the Fessenden method, ore bodies were located at the points of intersection of loci determined from the total times required for the waves to travel over their paths. Fessenden also was able to locate an ore body by measuring the direction of arrival of a wave reflected from the ore body to the reception point, together with the lengths of the paths over which the reflected wave travels.

My method represents a substantial departure from and improvement over the prior art in that I measure the relative arrival times of seismic waves, particularly diffracted waves, at a plurality of reception points at least some of which are in a shadow zone of the ore body. By applying the principles of Huyghens' construction to these relative travel times I am able to reconstruct wave fronts in the earth as they have been distorted by the ore body. The distortion of such wave fronts indicates the presence or absence of an ore body and also its general character. From the relative arrival times I am also able to determine angles of wave arrival at various spaced reception points, from which I can then plot ray-lines representing ray paths in accordance with the angles and points of wave arrival on a map coordinated with the region under investigation, and determine the position, size and shape of the ore body by studying the convergence characteristics of these plotted lines. In my method, I locate a seismic wave source and the wave reception station at points in a mine working such as a drift, shaft, or diamond drill hole, or even at the surface of the earth, usually with the wave source and the wave reception stations on opposite sides of a region under investigation.

My invention may be used to locate and delineate accurately either high or low velocity ore bodies, but is specially useful in delineating ore bodies of low velocity. By a high or low velocity ore body, I mean an ore body which is characterized by a seismic wave velocity which is greater than or less than the seismic wave velocity of the surrounding country rock, as the case may be. By making possible the location and delineation of such ore bodies in inaccessible regions of the earth, I am able to supplement the usual mining methods by a relatively inexpensive method and thereby enable a mining engineer to determine the possible value of an inaccessible ore body prior to extending the mine workings into the region of the ore body. My method is also valuable in determining the size of an ore body which has already been penetrated by the mine workings. My method may also be used to establish useful geological information which may aid in locating ore bodies and is particularly useful in mapping geologic features of a mine such as breccia zones, intrusions, faulted areas, and other anomalous conditions, which may be associated with ore bodies.

The principal object of my invention is to provide a simple method of mapping ore bodies or other geological features of a mine.

Another object is to provide a simple method of mapping seismic wave fronts.

Another object is to provide methods for distinguishing between high and low velocity ore bodies.

Further and more detailed objects, uses and advantages of my invention will become apparent as the description thereof proceeds.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

For simplicity my invention is here first illustrated in connection with the delineation of ore bodies located in substantially homogeneous country rock. To further facilitate an understanding of my invention, I have illustrated its application to the delineation of horizontally situated ore bodies of considerable horizontal length and uniform cross-section in a vertical plane. It is to be understood however, that my method is not limited to the location of such ore bodies but may be modified by those skilled in the art in accordance with the principles herein set forth in order to delineate ore bodies of other shapes, and ore bodies located in non-homogeneous country rock.

Figure 1:
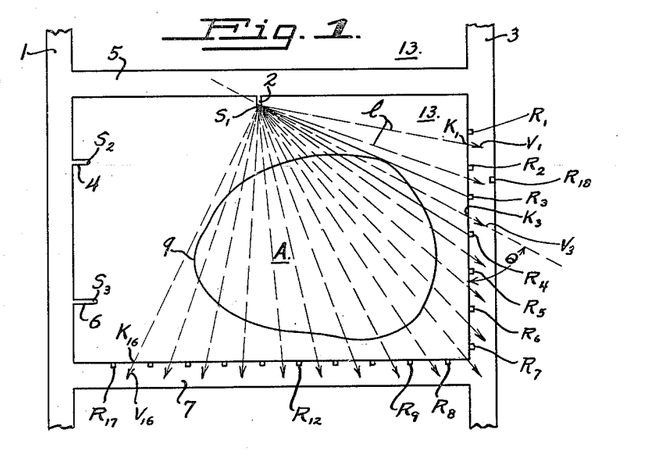
Fig. 1 is a section of a portion of the earth to which my invention is applied and represents the type of map obtained by my method in the absence of an ore body.

Referring to Fig. 1 which is a vertical sectional map of a portion of a mine, there is shown two vertical shafts, 1 and 3 which are connected by an upper horizontal drift 5, and a lower horizontal drift 7. Assuming that I desire to determine whether or not an ore body is located within the general region A outlined by the curve 9, I first drill a shallow hole 2, into the wall of one of the mine workings, in this particular instance in the floor of the drift 5, and place therein a charge of explosive which then is to serve as a seismic wave generating source $S_1$.

If various straight lines are drawn radially from the shot point $S_1$, some of these lines will intersect the area defined by the curve 9, and some will fall completely outside of said area. The region on the opposite side of area A from the shot point $S_1$, in which radial lines intersecting curve 9 fall, is referred to as the shadow zone of said region A, as viewed from the source $S_1$. When the country rock is homogeneous the shadow zone of a region or of an ore body referred to a particular source is identical with the geometrical shadow thereof. In other cases the shadow zone of an ore body is simply the zone to which waves cannot travel directly from the seismic wave source without having been deflected by refraction or diffraction by the ore body.

Seismic wave receptors $R_1$ to $R_{17}$ are placed on or embedded in a wall of a mine working, at substantially uniform intervals, at such points that some of these receptors lie in the aforementioned shadow zone, and some lie outside of said shadow zone. As illustrated in the drawings, receptors $R_1$, $R_2$, $R_3$, and $R_{17}$ lie outside the shadow zone of the region A, and the other receptors, namely $R_3$ to $R_{16}$ lie in said shadow zone. Such receptors may also be placed in a line along the length of a diamond drill hole if desired to extend or limit the region of exploration.

Seismic waves generated at the source $S_1$, travel radially outwardly from the source to the respective reception points. Such seismic waves reaching the receptors $R_1$ to $R_{17}$ are there converted into electrical waves of corresponding amplitude and identical frequency and the relative times of arrival of these waves at the receptors are measured. Receptors suitable for this purpose are well known in the art.

While I ordinarily prefer to generate impulsive or transient seismic waves and measure the relative times of arrival of the first waves to arrive at the reception points, I am also able to make geological studies by measuring the relative times of arrival of later waves. Under some circumstances I prefer to generate continuous waves at the wave source and measure the relative time-phase of waves arriving at the reception points. However, to simplify the description, I shall confine the following description to one preferred form of my invention in which I generate impulsive seismic waves such as by the detonation of explosives at the wave sources.

Figure 2:
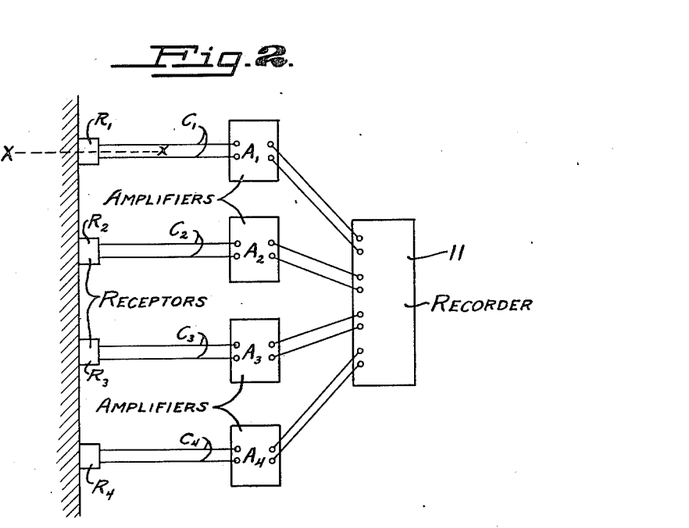
Fig. 2 is a schematic diagram of apparatus used in detecting and recording seismic waves.

In Fig. 2 I have illustrated apparatus for recording waves received at receptors $R_1$, $R_2$, $R_3$, and $R_4$. The electrical output from each of the receptors from $R_1$ to $R_4$ is applied through a corresponding cable $C_1$ to $C_4$ to a corresponding electrical amplifier $A_1$ to $A_4$. The electrical output of each amplifier is applied to a separate galvanometer in the multiple element recorder 11, where the electrical waves are recorded as time-coordinated traces on a common record. In order to accurately delineate an ore body I prefer to record high frequency components of the seismic waves of the order of 200 to 500 cycles per second or higher. Energy of the generated waves may be concentrated in this high frequency range by detonating a small explosive charge in firm contact with rock. Records of high frequency waves may also be obtained by filtering out any low frequency waves in the receiving or amplifying apparatus. By recording such high frequency waves I am able to estimate the relative arrival times of waves at various reception points to an accuracy of 0.1 millisecond. With such accurate timing, I obtain a seismic exploration system of very high resolving power applicable to mining problems. I have successfully applied such a system to the delineation of ore bodies twenty-five feet across by recording waves at distances from 200 to 400 feet from the wave source.

If enough amplifier channels and recorder elements are available, each of the receptors $R_1$ to $R_{17}$ may be connected to a separate amplifier and galvanometer in order to record on a single record waves received at the respective receptors when a single charge is exploded at the source $S_1$. However, if the number of amplifying and recording elements is less than the number of points at which it is desired to place receptors for receiving waves generated at the source $S_1$, a complete recording of waves traveling through the region under investigation may be obtained by exploding a first charge at the source $S_1$ to generate a first set of seismic waves and receiving the generated waves at a first set of reception points, such as $R_1$ to $R_4$, to obtain a first record, exploding a second charge at source $S_1$ and recording waves received at a second set of reception points, say $R_4$ to $R_7$ inclusive, adjacent to the first set of reception points $R_1$ to $R_4$ inclusive, and making a corresponding second recording. In using this process there is preferably a reception point common to the two sets of reception points. This process may then be repeated a number of times until waves generated at the source $S_1$ have been received and recorded at each of the receptors $R_1$ through $R_{17}$.

If no ore body is present in the region A under investigation, waves generated at $S_1$ will travel by straight line paths to the respective receptors $R_1$ through $R_{17}$. If there is an ore body in the region A, some of the waves arriving at some of the receptors will have traveled over non-rectilinear paths due to refraction or diffraction of waves by the ore body. In any event, I measure the relative times of arrival of waves at pairs of successive receptors, and determine therefrom the direction from which waves arrive at the receptors. For example if the difference in arrival time of waves which arrive at receptors $R_4$ and $R_3$ over the paths $S_1R_4$ and $S_1R_3$ is $\Delta t$, and the measured distance between these receptors is $d$, and the velocity of waves traveling in the country rock $13$ is $V$, then the ray path of waves arriving at the receptors $R_3$ and $R_4$ makes an angle $\theta$ with the line joining the points at which receptors $R_3$ and $R_4$ are located. This angle of wave emergence $\theta$ is given by the following equation:

$$\cos \theta = \frac{V \Delta t}{d} \qquad (1)$$

As shown in Fig. 1, I represent the waves arriving at the receptors $R_3$ and $R_4$ by plotting on a map of the region under investigation a wave emergence vector $V_3$ at the midpoint $K_3$ of the line joining receptors $R_3$ and $R_4$, which vector $V_3$ makes an angle $\theta$ with the line joining $R_3$ and $R_4$. Similarly vectors $V_1$ through $V_{17}$ representing the waves arriving at the other pairs of reception points, $R_1$, $R_2$, through $R_{16}$, $R_{17}$ are plotted on the map. The midpoint between $R_1$ and $R_2$ is designated as $K_1$, between $R_2$ and $R_3$ as $K_2$, etc. I draw ray-lines extending said vectors in the direction from which the waves travel to said midpoints. Such ray-lines are shown dotted in Fig. 1.

By studying the convergence characteristics of said ray-lines, I am able to determine the presence or absence of an ore body in the region A, and also whether the ore body is of a higher or lower velocity than the country rock. From plots of such ray-lines I am also able to delineate such an ore body. If no ore body is present in a homogeneous country rock all of the lines will converge at the source $S_1$ as indicated by the dotted lines $l_1$ in Fig. 1. If an ore body is present in the region under investigation, waves which travel directly to the receptors without having been deflected by the ore body, will result in ray-lines which converge at the source $S_1$. Waves which have traveled to the receptors after having been refracted or diffracted by the ore body will result in ray-lines which generally do not pass through the source at which the waves originate, but will result in convergence patterns which when properly interpretated will yield valuable information regarding any ore bodies present. In this specification I use the word "deflection" to mean refraction or diffraction.

Figure 3:
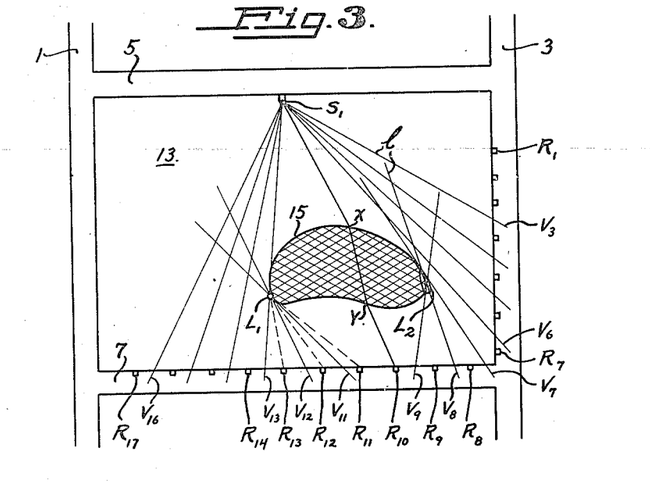
Figs. 3 and 4 are sections of the earth and illustrate the application of my invention to the delineation of a low velocity ore body located in a high velocity country rock.

Fig. 3 illustrates an application of my invention to a case in which a low velocity ore body $15$ is located in a high velocity country rock, $13$, within the region A of Fig. 1. In such a case the first wave to arrive at the receptors $R_1$ to $R_7$ and $R_{14}$ to $R_{17}$ are waves which travel along straight line paths from the shot point $S_1$ outside of the shadow zone of ore body $15$. Waves starting from source $S_1$ which just graze the edge of ore body $15$ are diffracted into the shadow zone of the ore body. If the velocity of the ore body is sufficiently low, these diffracted waves are received at receptors $R_8$ through $R_{13}$ located in said shadow zone prior to the arrival at these points of waves which travel through the ore body by paths involving refraction of waves by said ore body.

For example, diffracted waves reach receptors $R_{11}$, $R_{12}$, and $R_{13}$ along the paths $S_1L_1R_{11}$, $S_1L_1R_{12}$, and $S_1L_1R_{13}$ respectively. The ray-lines representing the vectors $V_{11}$, $V_{12}$, and $V_{13}$ and representing the direction of travel of the first waves to arrive at receptors $R_{11}$, $R_{12}$, $R_{13}$, and $R_{14}$ converge in a small area $L_1$ at the edge of the ore body $15$. Similarly, ray-lines, $V_7$, $V_8$, and $V_9$ representing the travel direction of the first waves to arrive at receptors $R_7$ through $R_{10}$ converge in a small area represented by $L_2$. For the sake of simplicity these small areas $L_1$ and $L_2$ may be considered as points of ray-line convergence.

The two points of convergence $L_1$ and $L_2$ of the diffracted waves arriving at receptors in the shadow zone of the ore body $15$ fall on the extremities of the ore body on or very close to the least divergent undeflected ray-lines $V_6$ and $V_{13}$ on opposite sides of the ore body, and thus delineate, in part at least, the extent of the ore body.

In order to delineate said ore body $15$ more accurately I generate waves at other sources $S_2$ and $S_3$ which may be located for example in holes $4$ and $6$ respectively, drilled in the wall of shaft $1$ shown in Fig. 1. I originate waves at these sources and record the relative times of arrival of these waves at receptors $R_1$, through $R_{17}$, in the manner hereinabove explained.

Figure 4:
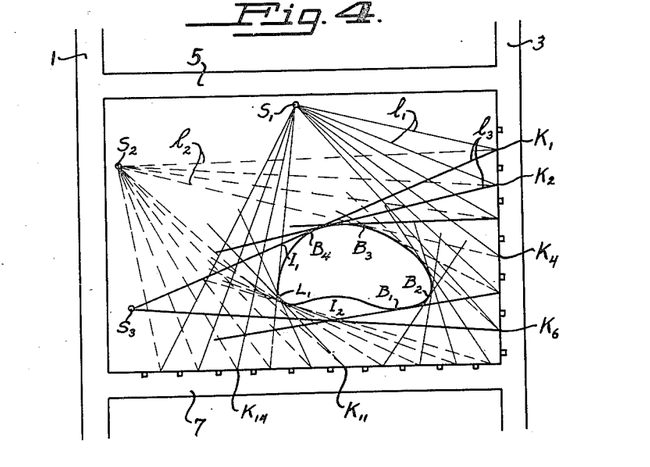

In Fig. 4 is shown a plot of data obtained by plotting ray-lines corresponding to the direction of arrival of the first wave to arrive at the receptors, $R_1$–$R_{17}$, from the respective sources $S_1$, $S_2$ and $S_3$. The light solid lines $l_1$ are the same as those already shown in Fig. 3. The dotted lines $l_2$ represent a plot of the ray-lines of the first waves to arrive at the respective reception points from the source $S_2$. Heavy solid lines $l_3$ represent the ray-lines of the first waves to arrive at some of the reception points from the source $S_3$.

From a study of this plot it will be observed that there is a blank region enclosed by the various rays through which none of the first arriving waves travel. By drawing the envelope of the rays enclosing this space, I am able to accurately delineate the ore body. The envelope represented by the heavy curved line joining the points $B_1$, $B_2$, $B_3$, and $B_4$, which is tangent to ray-lines just on the edge of said enclosed region, delineates very accurately the right and upper portion of the ore body. While the rest of the ore body cannot be so accurately determined, it is clearly located within the region defined by the points $B_4$, $I_1$, $L_1$, and $I_2$. However, by generating waves at still other points, and receiving them at lines of receptors within the corresponding shadow zones of the ore body, the ore body may be even more completely delineated. It is to be noted that each of the diffracted rays and each of the least divergent straight line rays traveling from the various sources on opposite sides of the ore body namely $S_1K_6$, $S_1K_{13}$, $S_2K_4$, $S_2K_{11}$, $S_3K_1$ and $S_3K_6$, passes very close to or is actually tangent to the ore body. Each of said least divergent rays thus locates at least approximately the edge of the ore-body. The ore-body is delineated most accurately by spacing receptors apart a distance small compared to the length of the ore-body in the plane of the wave source and reception points. The ore-body is very effectively delineated when the distance between the line of receptors and the ore-body is comparable to the dimensions of the ore-body, as under these circumstances diffraction effects are greatest.

Figure 5:
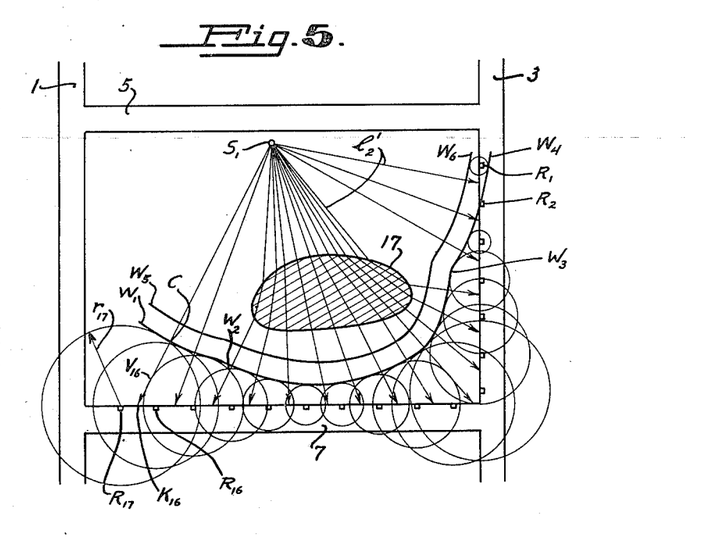
Figs. 5 and 6 are sections of the earth illustrating schematically the refraction of waves by a high velocity ore body, Fig. 5 also illustrating my method of wave front mapping.

If a high velocity ore-body 17 is located in the region under investigation, as shown in Fig. 5, the first waves from the source $S_1$ to arrive at receptors $R_1$, $R_2$, $R_3$, $R_{15}$, $R_{16}$, and $R_{17}$ travel thereto along rectilinear paths through the country rock. The first wave to arrive at the other receptors $R_5$–$R_{14}$, travel thereto along refraction paths through the ore-body. The various paths which would be followed by waves traveling from the source $S_1$ to midpoints between successive receptors are shown by the solid lines $l_2'$ of Fig. 5. The first waves generated at the source $S_2$, to reach said midpoints, are indicated by the solid lines $l_3'$ of Fig. 6. The direction of arrival of the respective waves at the reception points may be readily calculated by the methods hereinbefore explained.

Figures 7, 8, 13:
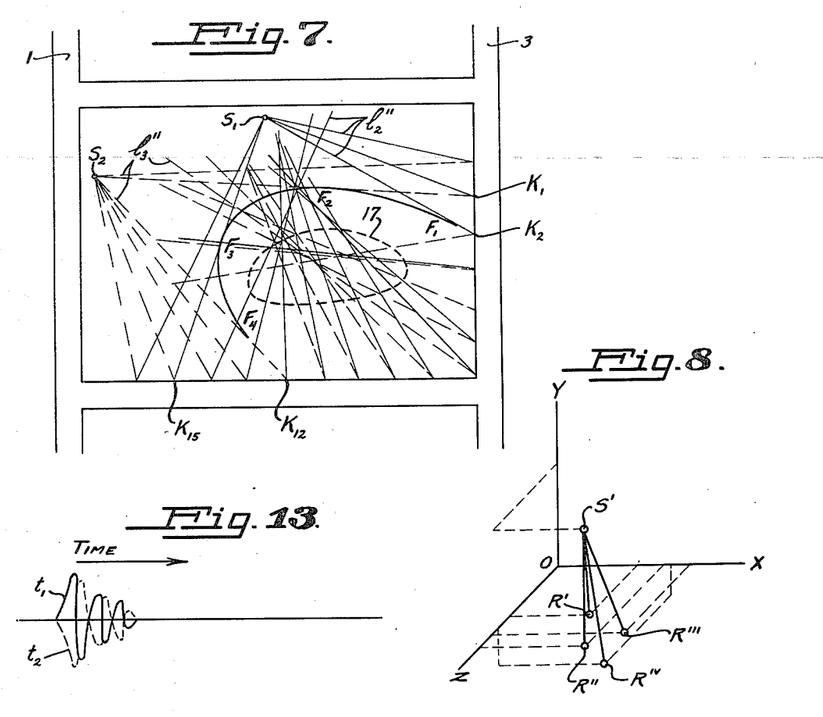
Fig. 7 represents a map incorporating the data obtained from the recording of waves traveling the paths illustrated in Figs. 5 and 6.
Fig. 8 is a schematic diagram of a form of my invention.
Fig. 13 is a graphical representation of a recorded trace of a wave received at a single reception point.

The ray-lines determined from the direction of arrival of the first waves received at successive pairs of receptors from the source $S_1$, have been plotted as solid lines $l_2''$ in Fig. 7. The ray-lines determined from the direction of travel of waves generated at source $S_2$, and received at said receptors have been plotted as dotted lines $l_3''$ in Fig. 7. Here it will be noted that certain ray-lines converge in the corresponding wave sources, indicating that the areas through which such ray-lines pass lie outside the shadow zone of the ore body. This is valuable information in that it guides a mining engineer in excluding certain regions from further working. Other ray-lines corresponding to waves which have been refracted by the high velocity ore body do not converge at the sources at which the waves were generated, but form an irregular pattern having no particular interpretive value except insofar as the pattern indicates that the first waves to arrive at the corresponding receptors are refracted rather than diffracted waves. If they had been diffracted waves, a central blank portion would be indicated, and such ray-lines would converge on or close to straight ray-lines representing paths of waves from the same source which have just grazed the edge of the ore body as indicated in Fig. 3. The fact that first waves arriving at some of the receptors have been refracted rather than diffracted, indicates that the ore body present has a higher velocity than the country rock.

If an envelope $F_1F_2F_3F_4$ is drawn tangent to the least divergent ray-lines $S_1K_2$, $S_1K_{15}$, $S_2K_1$, and $S_2K_{12}$ converging at the corresponding wave sources $S_1$ and $S_2$, the region on the convex side of this envelope definitely does not contain any portion of the ore body. The ore body producing the wave deflection lies on the concave side of this envelope.

In the above illustration of my invention, I have described how ore bodies can be delineated from a study of the direction of travel of the first wave to arrive at the receptors. By plotting the ray-lines determined from the relative times of arrival of the first arriving waves and studying the convergence characteristics of said ray-lines, I am able to determine the presence or absence of an ore body in a region under investigation, and I am also able to determine whether the ore body has a lower or a higher velocity than the country rock in which it is situated. It is understood, of course, that the ray-lines determined from the relative times of arrival of waves which are recorded subsequently to the first arriving waves may also be plotted on a map of the region under investigation in order to add to the investigator's knowledge of the region.

For example, after a wave has arrived at receptor $R_{10}$ of Fig. 3, along the path $S_1L_2R_{10}$, another wave will arrive along the path $S_1XYR_{10}$, $X$ being the point where a wave from the source $S_1$ is incident on the ore body, and is refracted into the ore body along the path $XY$ and where $Y$ is the point of emergence of the wave from the ore body. By plotting ray-lines determined from the arrival of waves refracted through the low velocity ore body of Fig. 3, an irregular configuration of ray-lines such as that shown in Fig. 7 will be obtained.

Figure 6:
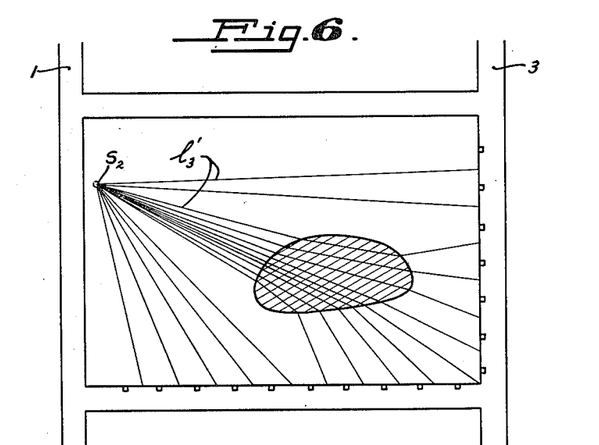

In a somewhat similar manner, after the first waves reach the receptors after traveling through a high velocity ore body along a refraction path have been recorded, waves which graze the edge of the ore body and are diffracted into the shadow zone of the ore body will be received. Thus if ray-lines determined from relative arrival times of waves diffracted around the high velocity ore body of Figs. 5, 6, and 7 are plotted, a map somewhat like that shown in Fig. 3, in which the diffracted ray-lines converge to points at the extremities of the ore body will be obtained.

It is understood, of course, that when the reception points are very close to a low velocity ore body, some of the first waves to arrive at receptors near the center of the shadow zone, may be those which have traveled by refraction paths through the ore body, while the first waves to arrive at reception points near the edge of the shadow zone will be diffracted waves. The principles already outlined will enable those skilled in the art to interpret such data and to distinguish between diffracted and refracted waves.

It is sometimes desirable to know not only the direction of wave travel, but also the sense of travel of the waves in that direction. In order to determine the sense as well as the direction of arrival of waves in the region of the receptors $R_2$ and $R_3$, for example, of Fig. 1, I place another receptor $R_{18}$ on the side of the shaft 3 beside the receptors $R_2$ and $R_3$. In such a case the wave will arrive at receptors $R_2$ and $R_3$ before arriving at receptor $R_{18}$, if the wave is traveling from the left, and will arrive at $R_{18}$, before reaching one of the other receptors, $R_2$ and $R_3$ if the wave is traveling from the right. In order to make such a determination of sense possible, the three receptors $R_2$, $R_3$, and $R_{18}$ must lie in a plane which is not parallel to the wave front of the received waves. Since the first portion of a wave to arrive at a receptor is almost invariably a compressional wave, the sense of wave travel may also be ascertained from a determination of the sense of the initial displacement of the receptor along its vibration axis. For example, for a given set of connections between the receptor $R_1$, amplifier $A_1$, and recording element in recorder 11, a recorded trace may have an initial displacement upward as shown by the solid line $t_1$ or downward as shown by the dotted line $t_2$ of Fig. 13 for waves arriving from the left or the right side of shaft 3, as the case may be.

In the above described illustrations of my invention, I have illustrated simple cases in which the waves travel along paths which lie in the plane of a map including the wave source and the reception points. However, my invention may be extended to include other cases by supplementing the principles hereinabove described with well known principles of solid geometry and trigonometry. Essentially the extension of my method to such a case involves the determination of the sense and direction of wave arrival at various reception points, and the determination of the convergent characteristics of such waves by the projection thereof into various plane maps coordinated with the region under investigation. In the general case, when only two receptors are used to determine the direction of wave arrival at a point such as $K_3$ in Fig. 1, the wave emergence angle $\theta$ determines a cone, of apex half-angle $\theta$, having an axis passing through the reception points $R_3$ and $R_4$. The ray-line must lie in the surface of this cone. If three receptors are used to detect the wave arrival at $K_3$, the ray-lines are restricted to two lines lying in said cone, which lines are mirror images of each other with respect to the plane of the three receptors. However, by receiving waves at four reception points placed at the corners of a tetrahedron at the point under investigation, I am able to resolve all ambiguity and completely determine the sense and direction of travel of a wave received at said point.

Fig. 8 illustrates schematically how I dispose four receptors in order to make such a complete determination. In this drawing X, Y, and Z represent the axes of a rectilinear coordinate system located in the earth. Receptors $R'$, $R''$, and $R'''$ are located at various points in the planes XZ, while receptor $R^{iv}$ is located at a point outside of the plane of the aforesaid receptors $R'$, $R''$, and $R'''$. $S'$ is a shot point which is located in the first octant at equal distances from the X, Y and Z axes. By generating a wave at the shot point $S'$, and recording the relative times of arrival of the wave at receptors $R'$, $R''$, $R'''$, and $R^{iv}$, I am able to determine the exact orientation in space of the line along which the wave travels to the receptors. The wave might reach the receptors by a direct path drawn from $S'$ to the receptors, or by some other path along which the wave might travel as a result of deflection by an ore body. In view of the foregoing explanations, the exact method of computing the direction of ray-lines from relative wave arrival times at three or four points may be readily provided by a skilled mathematician, and need not be explained in detail here.

By placing receptors at the corners of tetrahedrons located both within and without the shadow zone of a region under investigation, very detailed information regarding ore bodies in said region may be obtained. In any case whenever the direction of wave arrival at a reception point is to be determined, the waves are received at receptors positioned close enough together at the reception point so as to receive a bundle of waves which travel to the receptors over closely adjacent paths. This result is most easily accomplished by placing said receptors a distance apart which is very small compared to the length of the path over which said waves travel thereto, and small compared to the dimensions of any ore body which is being sought.

Another method utilizing the relative arrival times of a wave at various receptors positioned in the earth involves the application of Huyghens' principles to reconstruct the actual wave fronts of waves which have traveled through the earth. This method, one form of which is illustrated in detail in Fig. 5, involves the measurement of the time delay $T_n$ between the arrival of a wave at a station $R_n$ relative to the arrival of the wave at some base station, for example $R_2$, $T_1$ being this delay for the wave arriving at receptor $R_1$, $T_3$ the corresponding time delay for the wave to arrive at station $T_3$, etc. up to $T_{17}$ which is the time delay required for the wave to arrive at the receptor station $R_{17}$. This delay may be considered positive or negative according to whether the wave in question reached the receptor station $R_n$ after or before arriving at said base station. For each of these time delays I compute a radius $r_n$ given by the formula $$r_n = \frac{VT_n}{s} \qquad (2)$$

where V=velocity in country rock, and
s=the map scale.

Thus if the velocity in the country rock is 8000' per second, $T_{17}=0.0100$ second, and the scale is 100 feet to the inch, then $V_{17}=0.80''$. This radius $r_{17}$ is plotted on the map shown in Fig. 5, about the reception point $R_{17}$ as a center. Similarly radii corresponding to the other reception points are computed and corresponding circles of such radii are drawn about the corresponding reception points as centers. Such circles are also shown in Fig. 5. Of course, if the side of the reception point line on which the wave front will appear is known only arcs of these circles need be drawn on that side.

I then draw the envelope $W_1W_2W_3W_4$, to these circles, or arcs $W_1W_2W_3W_4$ represents on the map an actual wave front of a wave which has traveled outwardly from the source $S_1$ to the various reception points. The bulge between $W_2$ and $W_3$ of these circles represents an anomaly in the wave front due to the presence of the high velocity or body 17.

It is to be noted that the wave front passes through the reception point $R_2$, and that the portion of the wave front $W_1W_2W_3R_2$ lies on the source side of the reception points, whereas the portion of the wave front $R_2W_4$ lies on the opposite side of receptor $R_1$ from the wave source. This is due to the fact that energy from the source $S_1$ has reached each of receptors $R_3$, $R_4$–$R_{17}$, after reaching $R_2$, while energy of the same wave does not reach $R_2$ until subsequent to its arrival at $R_1$. If desired other circles of equal radius may be drawn about centers located on the wave front $W_1W_2W_3W_4$ and an envelope of these circles obtained to produce another wave front $W_5W_6$. Still other wave fronts may be reconstructed by successive application of these principles to other time increments, eventually extending the wave front study to the ore body itself or even to the wave source.

Since the wave emergence vectors are normal to the wave fronts, I may also reconstruct the wave front by drawing these vectors on the map of the region in accordance with the principles hereinabove outlined, laying off on these vectors lines of appropriate length according to the relative times of wave arrival. For example, in Fig. 5 I lay off on the vector $V_{16}$ a line having a length $$K_{16}C = \frac{(T_{17}+T_{16})V}{2s}$$

in the direction from which the wave travels to point $K_{16}$, where $(T_{17}+T_{16})/2$ is the average of the time delays at the receptors $R_{17}$ and $R_{16}$. By laying off similar lengths on the other vectors, I locate points of equal travel time and can reconstruct a wave front by drawing a line through these points of equal time.

Figure 9:
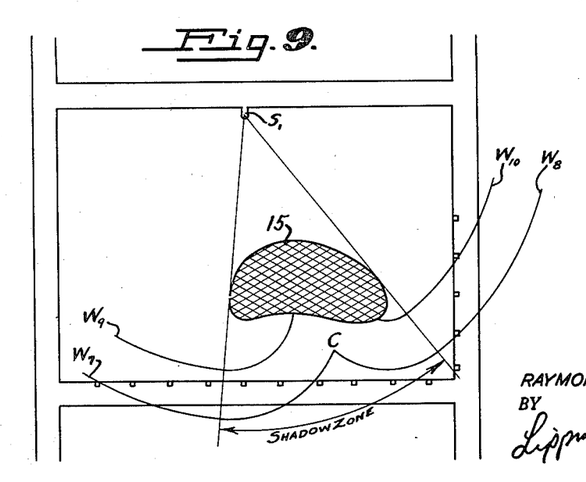
Fig. 9 is a map of wave fronts distorted by a low velocity ore body.

In a like manner, from the relative arrival times of the first arriving waves from $S_1$ when the region encloses the low velocity ore body 15 shown in Fig. 3, I reconstruct the wave fronts $W_7W_8$, $W_9W_{10}$ represented in the map shown in Fig. 9. In this case a cusp-like region C occurs in the wave front and indicates the existence of the low velocity ore body 15.

When applying Huyghens' principles to the reconstruction of wave fronts I thus first determine the relative wave arrival time at various points in a region under investigation and represent on a map of said region loci of equal time points, and reconstruct the wave front by drawing the envelope of such equal time loci. In some cases, it may be desirable to actually build a model of the region under investigation and represent such loci as spheres, or portions of spherical surfaces. Such a model may also be regarded as a map.

In all of the above illustrations of my invention, it has been assumed that the waves which arrive at the various receptors remain unaffected by conditions of the earth at the reception points. However, if local variations in velocity do exist, differential time corrections therefor may be made by utilizing the principles by which "weathering" corrections are made in the usual methods of reflection seismic surveying for oil prospecting purposes. This may be done for example for receptors $R_9$ to $R_{16}$, shown in Fig. 1, by first generating a seismic wave at the position of receptor $R_{17}$ and recording the time required for said wave to travel directly to said receptors $R_9$ to $R_{16}$ and measuring differences between these observed times and the times computed by dividing the velocity characteristic of the country rock by the distance of each of these receptors $R_9$ to $R_{16}$ from the position of receptor $R_{17}$. As a check a reverse shot may be made by receiving at receptors $R_9$ to $R_{16}$ waves generated at $R_8$. Other methods of making such corrections for local anomalies at the various receptor positions can be readily provided by those skilled in the art of seismic surveying. Those skilled in the art of seismic prospecting will readily apply such differences in times as corrections to the measured times before computing the relative arrival times referred to elsewhere herein.

While my invention has been illustrated by highly simplified and idealized representations thereof, it is to be understood that my invention is not limited in its application to such simple problems. For example, though my invention has been illustrated by considering waves originating from a real source, that is a source through which some of the ray-lines pass when plotted on the map of the region, my invention may also be applied in cases where the source is virtual, such as may occur if the waves have first been reflected or refracted by another geologic body before passage through the region under investigation. My invention may also be applied to regions in which the country rock is not of uniform velocity, such as when the country rock is stratified in some known manner, which may be determined either geologically or by geophysical methods, or when the velocity of seismic wave travel in the country rock varies in some generally systematic manner in the region. Ray-paths, wave fronts, and shadow zones which characterize some of these more complex conditions are illustrated diagrammatically in Figs. 10, 11, and 12.

Figures 10, 11:
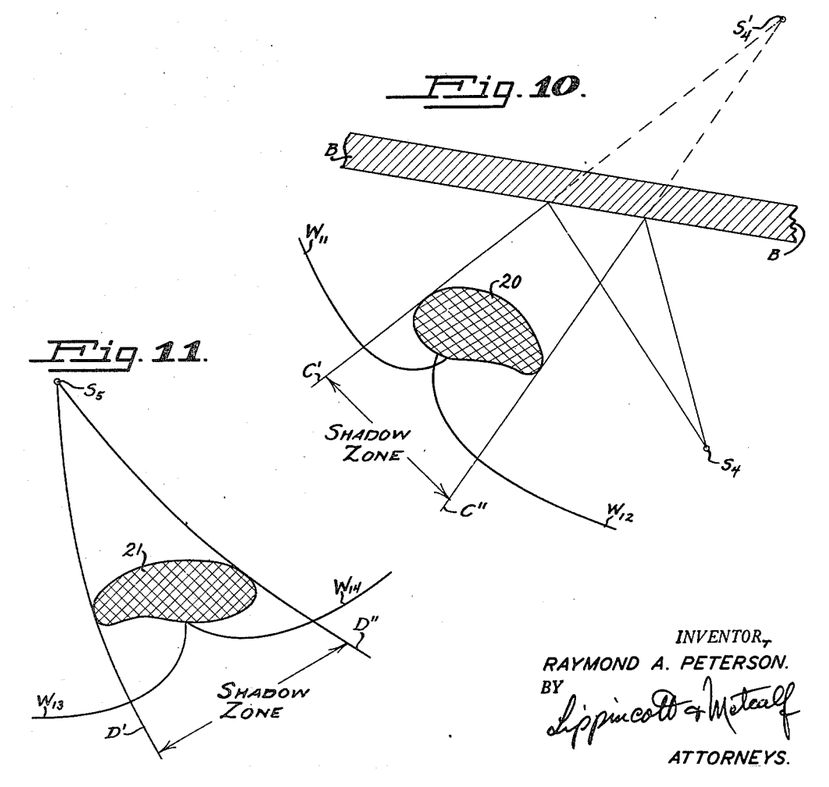
Fig. 10 is a schematic diagram representing an example of wave travel involving reflection in the country rock.
Figs. 11 and 12 are schematic diagrams representing examples of wave travel involving refraction in the country rock.

In Fig. 10 waves generated at a shot point $S_4$ and reflected by a geologic layer B—B, then pass through a region including an ore body 20. So far as the ore body is concerned waves appear to come from a virtual source $S_4'$ which is the mirror image of $S_4$ in the surface of the stratum B—B. At a particular instant after the reflected waves pass the ore body, a wave front $W_{11}W_{12}$ is formed in which parts of the wave front are made up of waves which have been diffracted into the shadow zone, the limits of which are defined by the lines $S_4'C'$ and $S_4'C''$ along which the least divergent waves travel on opposite sides of the ore body.

Fig. 11 similarly illustrates wave travel in a vertical section of a region in which the velocity characteristic of the country rock increases uniformly with depth in the region under investigation. In such a case waves travel along circular paths, the shadow zone appearing between the two least divergent paths $S_5D'$ and $S_5D''$ on opposite sides of the ore body 21. The portions of the wave front $W_{13}$ and $W_{14}$ outside of this shadow zone have the same shape as portions of the wave front which would occur if no ore body were present in the region. However the portions of the wave front $W_{13}W_{14}$ within the shadow zone represent waves which have been diffracted by the ore body into the shadow zone.

Figure 12:
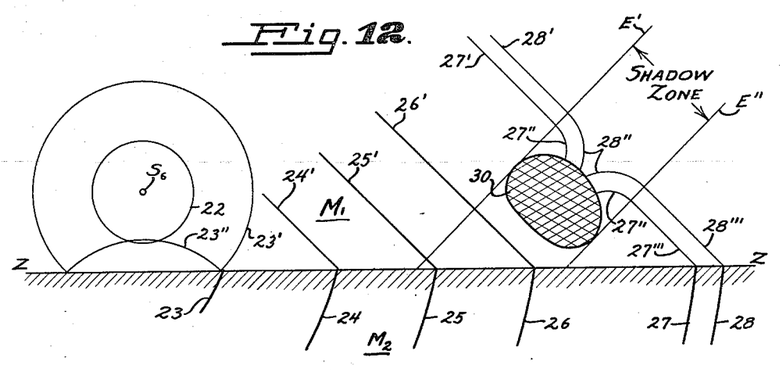

Fig. 12 illustrates schematically the wave travel conditions which may occur when an ore body 30 is located in a low velocity medium $M_1$ in the neighborhood of a plane Z—Z separating said low velocity medium $M_1$ from a high velocity medium $M_2$. In this case a wave generated at a source $S_6$ in the low velocity medium $M_1$ progresses outwardly, at one moment having a wave front 22. Later the wave has a more complex wave front 23, 23', and 23'', where 23 is a portion of the wave which has been refracted into the high velocity medium $M_2$, 23' is a section of the wave which has not yet contacted the interface Z—Z, and 23'' represents a portion of the wave which has been reflected at the plane Z—Z. The refracted portion of the wave progresses outwardly from the wave source to positions 24, 25, 26, 27, and 28 successively. As the refracted waves travel outwardly, portions of the energy of the refracted wave traveling in medium $M_2$ are continually being refracted into the low velocity medium $M_1$ at the critical angle. The wave refracted into the low velocity medium has a conical wave front which progresses outwardly from the source, successively reaching positions 24', 25' and 26'. Two lines E' and E'' perpendicular to these latter wave fronts and just grazing the ore body 30 on opposite sides thereof, define the shadow zone. As the wave refracted into the medium $M_1$ continues in its travel, portions thereof lying outside the shadow zone continue in conical form while other parts of the wave front which just graze the ore body are diffracted into the shadow zone. Diffracted portions of wave fronts are represented in Fig. 12 at 27'' and 28''. Portions 27', 27''', 28' and 28''' are plane, undiffracted waves.

It will be noted that the wave front due to diffracted waves in the shadow zones of the ore bodies considered in the examples illustrated in Figs. 10, 11 and 12, all have a cusp-like character.

My invention may readily be applied to the location and delineation of ore bodies existing under a wide variety of geological conditions even more complex than those illustrated in Figs. 10, 11, and 12. In any case the ray-lines and wave fronts may be constructed by proper application of the principles which have hereinabove been described.

If the seismic wave velocity characteristic of the country rock varies in some known manner, account is taken of this fact in constructing the ray-lines and wave fronts. In the case illustrated in Fig. 11, that is where the velocity gradient is uniform, ray-lines are represented as the arcs of circles rather than straight lines. Methods of plotting such circular ray-lines may be ascertained by reference to an article by Maurice Ewing and L. Don Leet, entitled "Seismic propagation paths," and published in the transactions of the A. I. M. E., Geophysical Prospecting, 1932, pages 45–62, and the articles "On seismic computations with applications," by M. N. Slotnic, published in Geophysics, vol. 1, No. 1, pages 9–22, and No. 3, pages 299–305 (1936). Those skilled in the art of geophysics will have no difficulty in applying my method to other situations in which the seismic wave velocity of the country rock varies in some known manner.

When applying Huyghens' principles in reconstructing wave fronts in regions where the country rock is heterogeneous, account is taken of variable velocity from point to point along the wave path in computing the radii of circles or spheres by means of Equation 2. In such cases wave fronts may be reconstructed by successively applying Huyghens' principles for small time increments, finally reducing the measurements to points of equal time. In the cases illustrated in Figs. 10 and 12, waves may travel by direct paths into the respective shadow zones described. In both cases the shadow zones referred to waves from virtual sources are of interest even though other shadow zones referred to waves traveling directly from the sources may also be of interest.

In Figs. 10, 11, and 12 as in Figs. 3, 4, and 9, I have illustrated the influences of low velocity ore bodies in distorting an otherwise simple wave front, since my invention is most easily applied to such cases especially when the spacing of the receptors is such that the diffracted waves are received before the refracted waves.

It thus appears that I have provided a simple and economical seismic method of delineating and mapping ore bodies in otherwise inaccessible parts of a mining region.

I claim:

1. In a method of delineating an ore body, the improvement which comprises generating at a source seismic waves which travel outwardly from the source and are diffracted by an ore body into the shadow zone of the ore body, receiving said diffracted waves at spaced reception points, determining the direction from which the diffracted waves travel to said reception points, plotting on a map coordinated with the region under investigation ray-lines representing the paths of travel of said diffracted waves to said reception points, and determining points of convergence of said ray-lines to locate extremities of the ore body on said map.

2. In a method of delineating an ore body, the improvement which comprises generating seismic waves at one source, some of which waves are diffracted into the shadow zone of the ore body and some of which travel only in the portion of the country rock outside said shadow zone, receiving said seismic waves at spaced reception points, determining the direction from which seismic waves travel to the respective reception points, plotting on a map coordinated with the region under investigation ray-lines representing the paths of wave travel to the reception points, repeating the process for seismic waves generated at another source, and determining the envelope of the plotted ray-lines to delineate the ore body on said map.

3. In a method of seismic prospecting, the improvement which comprises transmitting seismic waves from a point, receiving said seismic waves at four mutually spaced non-coplanar reception points, ascertaining the velocity of said received waves and measuring the relative times of arrival of the waves at the respective reception points, whereby the sense and direction of travel of a seismic wave to the reception points may be determined.

4. In a method of locating an ore body, the improvement which comprises generating seismic waves, at least some of which waves are refracted by the ore body, receiving said seismic waves at spaced reception points, determining directions of arrival of said seismic waves at the respective reception points, plotting on a map coordinated with the region under investigation ray-lines representing the travel direction of said seismic waves to the reception points, and determining the convergence characteristics of said ray-lines to locate the ore body.

5. In a method of locating an ore body, the improvement which comprises generating seismic waves which are deflected by the ore body, receiving such deflected waves at pairs of spaced reception points, measuring the difference in arrival time of the waves at the reception points to determine from the time differences the angle of emergence of the deflected waves at the respective pairs of reception points, and plotting on a map coordinated with the region under investigation ray-lines representing the travel direction of deflected waves received at the reception points.

6. In a method of geological exploration, the improvement which comprises generating waves which travel through the earth over paths at least some of which involve diffraction by a geological body of a velocity different from that of the surrounding country rock, receiving said waves including diffracted waves at spaced points in the earth, measuring the relative times of arrival of said waves at the respective reception points, and reconstructing the wave front of the wave as distorted by said geologic body from the relative arrival times at said spaced points.

7. In a method of delineating an ore body the improvement which comprises generating seismic waves at a source, some of which waves travel only in the portion of the country rock outside the shadow zone of the ore body, and some of which travel in the shadow zone of the ore body after being deflected by the ore body, receiving said seismic waves at spaced reception points, measuring the relative times of arrival of said waves at the respective reception points, locating on a map of the region under investigation points reached simultaneously by said waves, and reconstructing a wave front of said waves by drawing a line through said points of equal wave travel time, whereby the presence and nature of such an ore body may be determined from anomalies in the wave front.

8. In a method of delineating an ore body, the improvement which comprises generating seismic waves at a source, some of which waves travel only in the portion of the country rock outside the shadow zone of the ore body, and some of which waves travel in the shadow zone of the ore body after being deflected by the ore body, receiving said seismic waves at spaced reception points, measuring the relative times of arrival at the respective reception points, drawing about each reception point position indicated on a map of the region under investigation an arc of a circle having a radius $r$, given by the formula $$r = \frac{VT}{s}$$

where
$V$ = velocity of wave travel at the reception point
$T$ = time elapsed from a predetermined instant to the time the wave arrives at said reception point, and
$s$ = scale of map, and drawing the envelope of said circles to determine a wave front of said wave, whereby the presence and nature of such an ore body may be determined from anomalies in the wave front.

9. In a method of delineating an ore body the improvement which comprises generating at a point in the earth seismic waves some of which are diffracted and some of which are refracted by the ore body, receiving said diffracted waves at points in the earth, in the shadow zone of the ore body before receiving said refracted waves, determining the velocity of the received waves and determining the angle of arrival of said diffracted waves at said points to locate the edge of the ore body.

RAYMOND A. PETERSON.